May 12, 1953 J. MARTIN 2,638,294

CONTROL MEANS FOR USE WITH EJECTION SEAT OF AIRCRAFT

Filed March 16, 1951 6 Sheets-Sheet 1

Inventor
JAMES MARTIN.
per Worth Wade
Attorney.

May 12, 1953   J. MARTIN   2,638,294
CONTROL MEANS FOR USE WITH EJECTION SEAT OF AIRCRAFT
Filed March 16, 1951   6 Sheets-Sheet 2

Inventor
JAMES MARTIN.
per Worth Wade
Attorney.

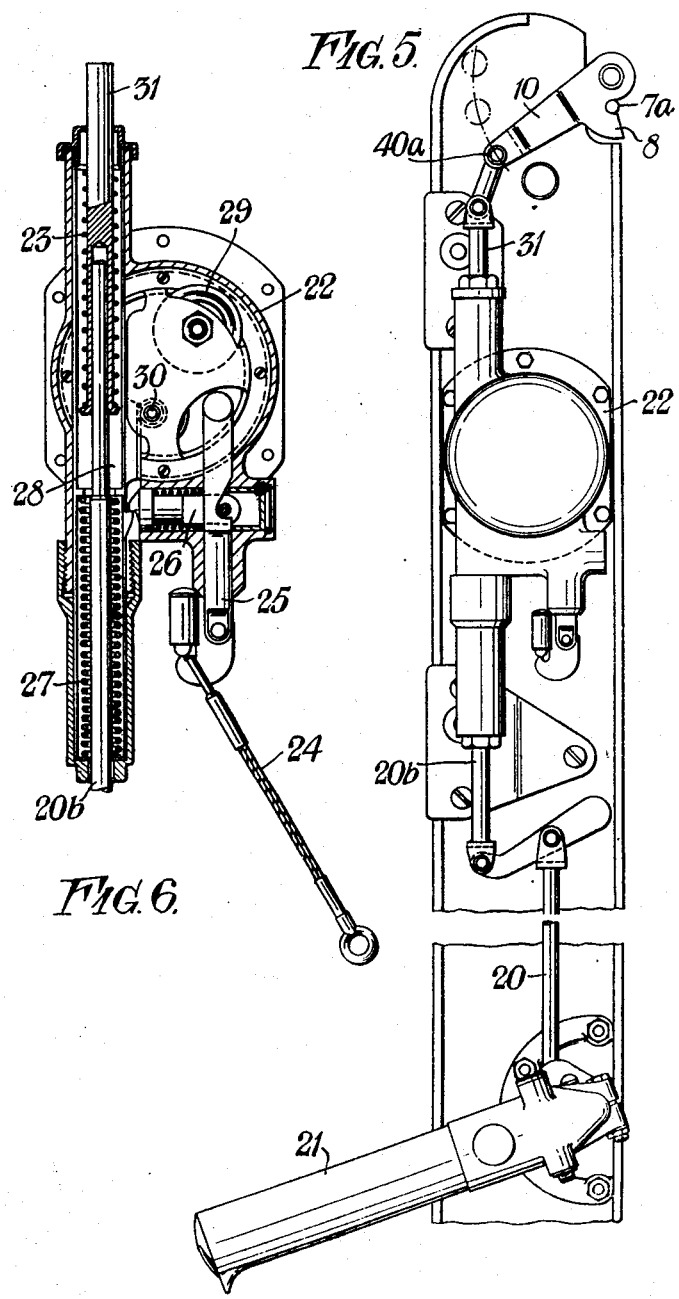

May 12, 1953  J. MARTIN  2,638,294
CONTROL MEANS FOR USE WITH EJECTION SEAT OF AIRCRAFT
Filed March 16, 1951  6 Sheets-Sheet 4

Inventor
JAMES. MARTIN.

perWorth Wade
Attorney.

May 12, 1953  J. MARTIN  2,638,294
CONTROL MEANS FOR USE WITH EJECTION SEAT OF AIRCRAFT
Filed March 16, 1951  6 Sheets-Sheet 5

Inventor
JAMES MARTIN
per Worth Wade
Attorney.

May 12, 1953  J. MARTIN  2,638,294
CONTROL MEANS FOR USE WITH EJECTION SEAT OF AIRCRAFT
Filed March 16, 1951  6 Sheets-Sheet 6

Inventor
JAMES MARTIN.
per Worth Wade
Attorney.

Patented May 12, 1953

2,638,294

UNITED STATES PATENT OFFICE 2,638,294

CONTROL MEANS FOR USE WITH EJECTION SEAT OF AIRCRAFT

James Martin, Higher Denham, near Uxbridge, England

Application March 16, 1951, Serial No. 215,966
In Great Britain March 22, 1950

11 Claims. (Cl. 244—122)

1

This invention relates to control means for regulating the descent by parachute from an aircraft by means of an ejection seat of the kind described in U. S. Patent No. 2,569,638 of October 2, 1951.

The specification of the aforesaid Patent No. 2,569,638 relates to the combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue parachute and harness, of means to disconnect the drogue parachute from the seat and to release the harness from the seat locks, the drogue parachute then drawing out the main parachute, the pilot thus being freed entirely from the seat to enable him to make a normal parachute descent, the means being operated by time delay mechanism which is set, as the seat is ejected from the aircraft, to become operative on the said means after a predetermined time interval.

There is described in the specification aforesaid drogue release mechanism and the present invention is directed thereto and comprises improvements on or modifications thereof and of allied parts.

The accompanying drawings illustrate examples of carrying into effect the improvements according to the present invention.

In the drawings:

Figure 1 is a side elevation of the release mechanism,

Figure 2 an end elevation and

Figure 3 a plan view thereof.

Figure 5 is a side view of another form, and

Figure 6 a sectional view of the same.

Figure 7:
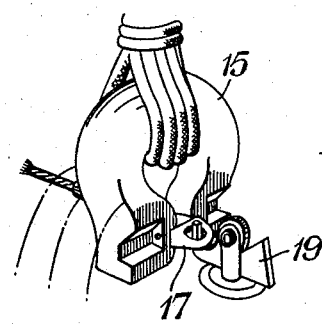
Figure 8:
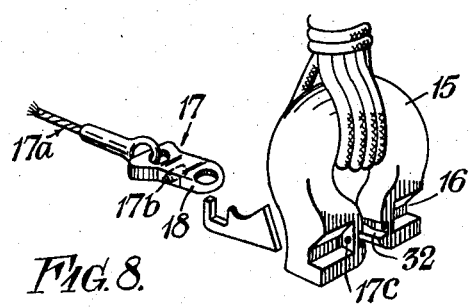

Figures 7 and 8 illustrate the drogue shackle and parts co-operating therewith.

Figure 9:
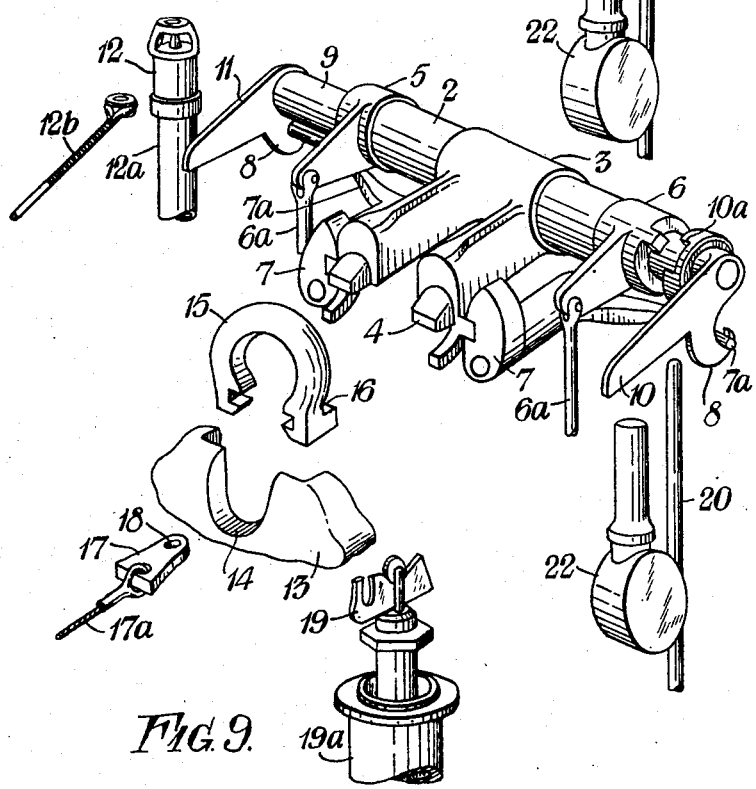

Figure 9 is an exploded view of the component parts, while

Figures 10 to 13 inclusive are perspective views showing the position of the parts of the mechanism at various stages of operation.

Figure 14:
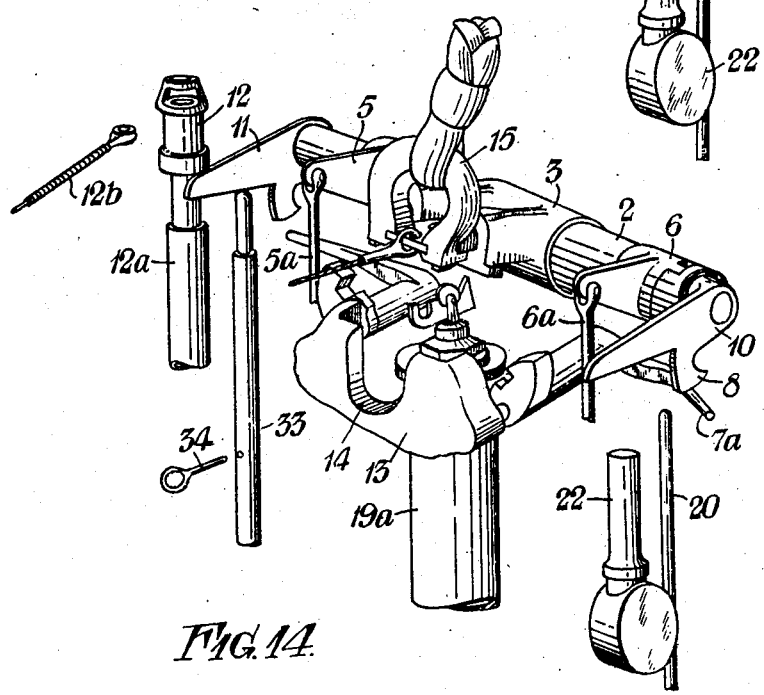

Figure 14 shows an emergency device referred to hereinafter.

The drogue release mechanism may be integral with or secured to the top cross beam of the main seat frame.

Referring to the drawings. Across the top

2 rear of the beam is a cylindrical bearing 1 for an outer torque shaft 2. Splined on to the middle portion of this shaft is a forked lever 3 and within each member of the fork is a spring loaded latch 4. Keyed on to the extremities of the outer torque shaft are levers 5 and 6 which are connected to the lock control linkage on the main frame of the seat through rods 5a and 6a. The outer face of the boss of the lever 6 is provided with face teeth.

Mounted on the seat frame and alongside the arms of the forked lever 3 are two latch levers 7 the hooks of which engage on lands projecting from the sides of the forked lever 3. The longer arms 7a of the latch levers project outwards beneath the centre line of the torque shaft 2 to be retained in a locked position by hooks 8 which are in turn attached at each extremity of an inner torque shaft 9 which is free to turn independently of the outer torque shaft. Projecting forward from the hooks 8 and integral therewith are levers 10 and 11. The lever 10 is the main actuating lever of the mechanism and is operated in the normal automatic case by the time delay mechanism 22 mounted below it, or in an emergency case by a push rod 20 controlled by a manual override lever 21.

The lever 10 is spring loaded downwards as hereinafter described so as to ensure that the hooks 8 are held in position and to avoid premature release of the latch levers 7 due to any buffeting of the seat on ejection.

The inner face of the boss of lever 10 is provided with face teeth 10a to mate with those on the boss of lever 6. Sufficient clearance or backlash is provided to permit the inner torque shaft 9 to rotate far enough to disengage the hooks 8 from the arms 7a of the latch levers 7 without transmitting drive to the outer torque shaft 2. In the case of automatic operation time delay mechanism 22 raises the actuating lever 10 only far enough to disengage the hooks 8. This frees the latch levers 7 which in turn free the forked lever 3 thus permitting the drogue shackle 15 to be drawn from its slot, by the drogue.

In the case of an emergency manual control release, the push rod 20 drives lever 10 beyond the point of freeing the hooks 8 and transmits drive by means of the face teeth to the outer torque shaft 2. This frees the locks on the seat frame through levers 5 and 6 and rods 5a and 6a and also lifts the drogue shackle 15 out of a slot referred to later. The action of lifting the shackle from the slot disengages an eye 18, on a tapered link 17 of the firing cable 17a, from a sear 18 of the main ejector gun 19a thus rendering safe the firing mechanism. The emergency manual control is also used normally for the purpose of removing the parachute pack for servicing or storage.

The lever 11 functions to contact and raise a spring housing 12 at the top of the drogue gun piston 12a so as to release the attachment of the drogue line 12b at this point.

The top front portion of the top cross beam of the main frame is shaped to form in plan view a shallow channel like shaped wall 13 with a central flared cutaway 14. When the forked lever 3 is in the "down" or locked position it forms the fourth side of the said shaped wall thus providing a slot, slightly tapered in plan view, into which project the two spring loaded latches 4. The slot so formed provides a housing into which the drogue shackle 15 is inserted.

The drogue shackle 15 may be of substantially conventional form but, across the rear or wider faces, laterally, is a groove 16, in which the latches 4 of the levers 3 engage. Between the arms of the shackle 15 are two shallow tapered grooves 32 into which is fitted the tapered link 17. This link has a spring loaded plunger 17b set laterally within it. The taper ensures that the link is correctly inserted between the shackle arms and that incorrect assembly is avoided. The plunger 17b engages in a hole or depression 17c within the shackle arms and serves to lock the tapered link into the shackle sufficiently to prevent accidental withdrawal but not sufficiently to prevent normal operation. The rear end of the link terminates in the eye 18 which engages the sear 19 of the main ejector gun 19a when the shackle is inserted in the slot above mentioned. The forward end of the tapered link 17 is attached to the firing cable 17a which is in turn attached to the face screen or blind which is provided on the seat and is adapted to be drawn into position over the face of the occupant of the seat and to remain in position during the launching of the seat and its occupant from the aircraft.

In the case of an automatic operation, let it be assumed that the drogue has been opened out or deployed as described in the specifications referred to. The drogue is, in this case, attached to the seat proper only by the drogue shackle 15, thereafter it is attached to the crown of the parachute canopy.

The pull of the drogue is resisted ultimately by the hooks 8. When the time delay mechanism, as described in the earlier specifications, or according to the improvements or modifications hereinafter described, has completed its full stroke it has disengaged the hooks 8. As the drogue shackle 15 is withdrawn by the drogue from engagement in its slot, it transmits drive through the forked lever 3 to the outer torque shaft 2 and partial rotation of this shaft 2 causes the levers 5 and 6 to operate through 5a and 6a and release the locks on the main seat frame thus freeing the pilot and parachute pack from the seat.

In the event of the pilot wishing to free himself and his parachute from the seat, say in an emergency, it is necessary only to operate a manual override lever 21. This actuates a push rod 20, 20a which, according to one arrangement (see Figure 4), in turn pushes upward the main actuating lever 10, the first part of the movement freeing the hooks 8 and further movement rotating the outer torque shaft thus releasing the locks on the main seat frame and causing the forked lever 3 to lift out the shackle and simultaneously disengage the firing cable link from the sear and also disconnecting the drogue line 12b from the drogue gun, thus freeing the pilot and parachute pack from the seat. 23 indicates a lock retaining spring. This method is normally employed to remove the parachute pack and harness for servicing or storage.

Figure 1:
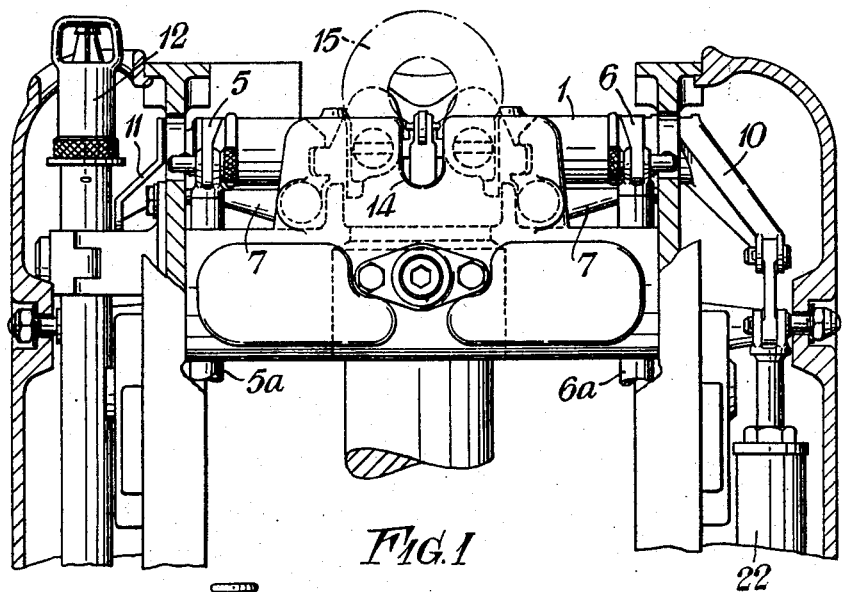
Figures 2, 4:
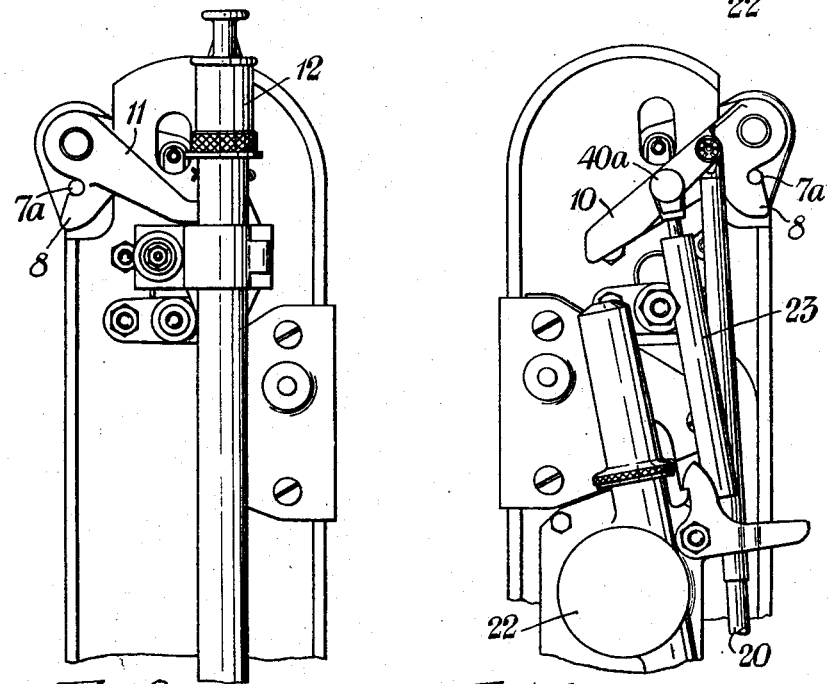
Figure 4 is a side view of one form of time delay mechanism and allied parts.
Figure 3:
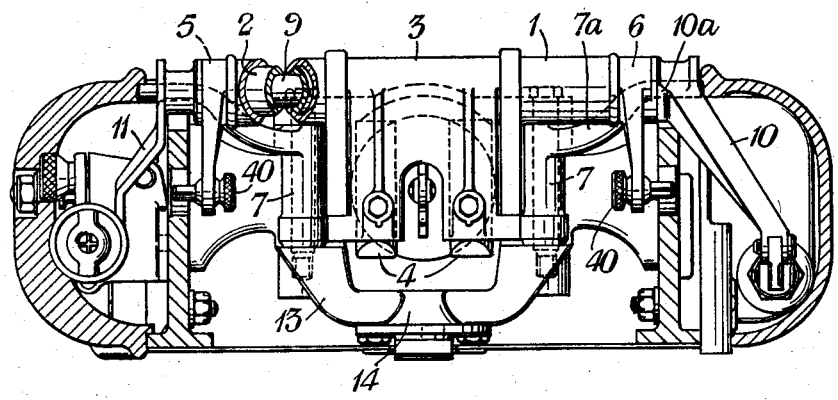

Access to the primary cartridge of the ejector gun is obtained first by removing the drogue gun, then by disengaging quick release pins 40 from the lock control run and pins marked 40a in Figs. 4 and 5 and swinging the forked lever 3 upwards clear of the firing mechanism.

Figure 10:
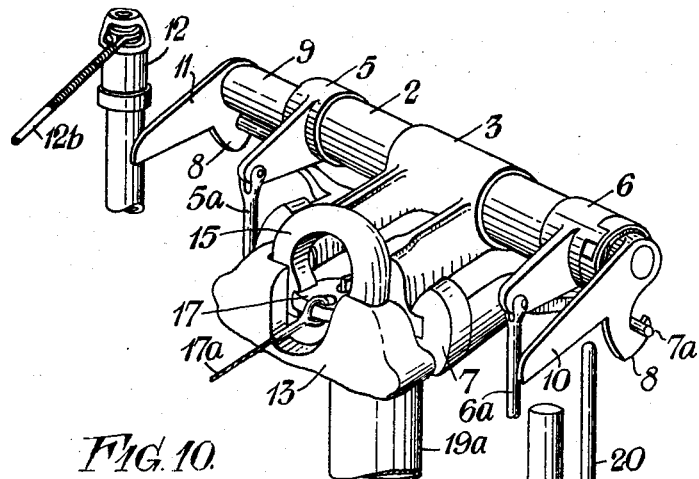

Now referring to Figure 10 this shows the component parts in correct relationship to one another. This is the normal locked position, with the drogue ejector line 12b attached to the drogue gun, the link 17 engaging the sear 19 of the main gun, and the latch levers 7 engaged in the retaining hooks 8.

Figure 11:
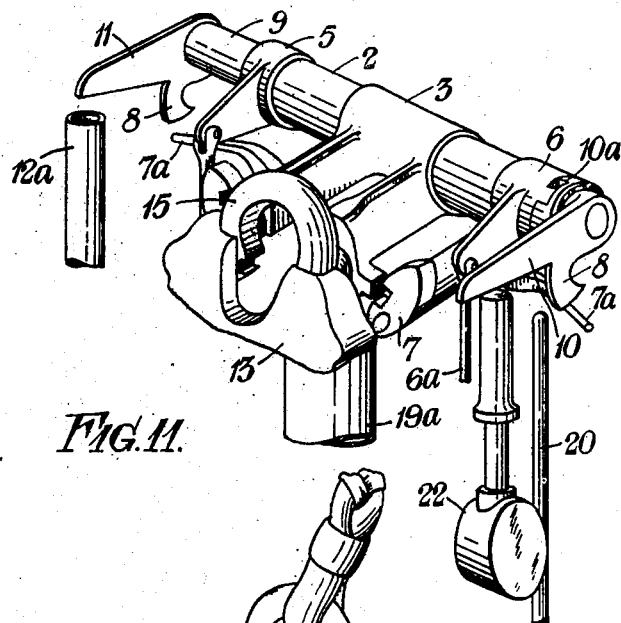

In Figure 11 the firing cable 17a has been pulled thus removing the link 17 and sear 19. The seat has been ejected thus firing the drogue gun and the time delay mechanism tripped. The time delay mechanism 22 in its fully operated or extended position has disengaged the retaining hooks 8 thus permitting latch levers 7 to free the forked lever 3. The shackle 15 is now free to be withdrawn from its slot by the drogue.

Figure 12:
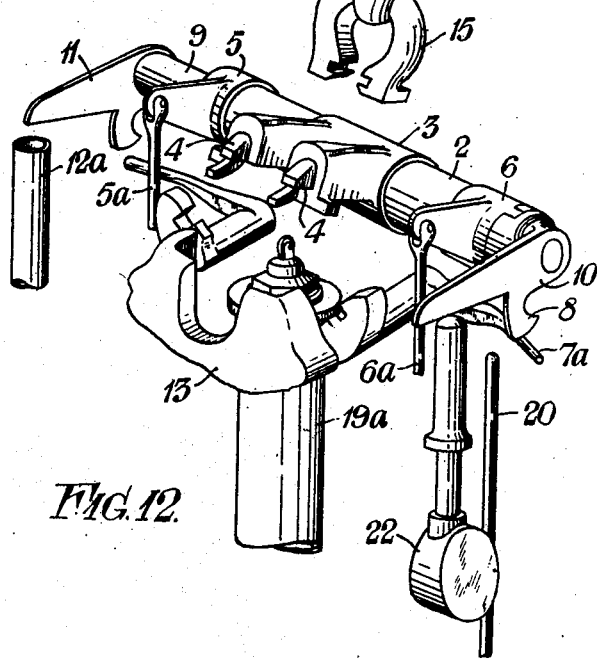

Figure 12 shows the shackle 15 drawn from its slot by the drogue. In so doing it has pulled upwards the forked lever 3 thus partially rotating the outer torque tube 2. This has caused levers 5 and 6 to pull the rods 5a and 6a connected to the harness locks on the seat frame thus freeing the pilot and his parachute pack from the seat.

Figure 13:
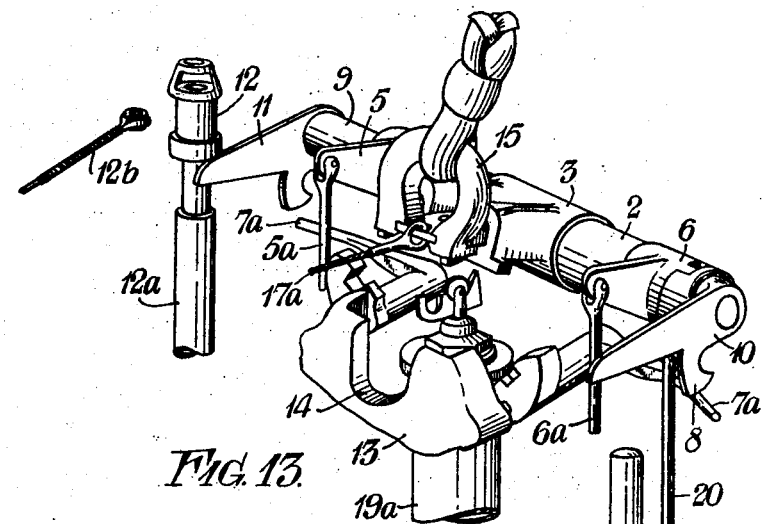

Figure 13 shows the effect of operating the mechanism by means of the push rod 20. In this case the shackle 15 has been lifted from its slot by the forked lever 3. This disengages the firing link 17 from the sear 19 thus disconnecting the firing cable. At the same time the lever 11 has raised the spring housing 12 thus freeing the drogue line from the drogue gun.

To cover the event of consecutive failure of the drogue gun, time delay device and manual override, a further emergency device may be incorporated. This is shown in Figure 14. A spring loaded plunger 33 is held in the locked position by a retaining pin 34. The retaining pin is connected to an extension of the parachute rip cord. On pulling the rip cord the top flaps would be freed thus releasing the drogue. Further pulling of the rip cord would pull out the retaining pin 34 thus permitting the plunger to fly up to push on lever 11 and so actuate the mechanism.

Referring now to Figures 5 and 6, these show a modified construction of time delay mechanism and other parts. For practical purposes these perform the same functions as in the earlier application for patent, but whereas these were separate assemblies they are now combined to make a cleaner and more efficient unit.

The items combined in this unit are time delay mechanism, lock retaining spring and manual override push rod.

Dealing with the automatic operation. On ejection, upward movement of the seat causes a static line 24 to pull down a sear rod 25. This action withdraws a latch 26 and permits an actuating spring 27 to push upwards a rack barrel 28. This upward movement is retarded by the action of a gear train terminating in an escapement which is in turn governed by a barostat capsule 29. The rack 28 disengages finally from a pinion 30 and the full power of the spring 27 is available to push upwards through 31 the lever 10 thus freeing the drogue shackle and releasing the locks as previously described.

Now, consider an emergency operation. The push rod is in three separate parts, 20, 20b and 31. The upper portion or sleeve 31 is spring loaded downward by the spring 23. As mentioned previously this ensures that the hooks 8 are held in position and avoids premature release of the latch levers due to buffeting of the seat on ejection.

The centre portion of the push rod 20b lies inside the bore of the main spring 27 and connects at its lower extremity through push rod 20 to the manual override lever 21.

Operation of this lever causes the push rod parts 20, 20b to move upwards and this movement is transmitted through the sleeve 31 to the actuating lever 10, thus releasing the hooks 8. Further upward movement causes the drive to be transmitted to the outer torque shaft 2 and so frees the drogue shackle and locks as previously described.

It will be understood that in the case of ejection from a high altitude the time delay escapement and the barometric control work in combination, whereas when ejection is made at low altitude the barometric control is not effective, so that it may be omitted altogether on low flying machines.

The sequence of operation is as set out below:

The seat is ejected from the aircraft by pulling down the face screen. As the seat moves upwards out of the cockpit a fixed projection in the cockpit or the static line 24 trips the time delay mechanism and sets it in motion. When the seat is clear of the aircraft the drogue gun is fired by static line or other means. This ejects the drogue from the wedge-shaped pack, and the seat is brought under control by the drogue. After an interval of several seconds, according to setting, the time delay mechanism completes its operation and breaks the coupling attaching the drogue to the seat. The drogue, thus released, moves away from the seat at the same time operating the linkage which simultaneously releases the pilot's seat harness, the protective screen when this is secured to the seat, the wedge-shaped pack, and at the same time the main parachute is withdrawn from the pack. The occupant of the seat and his equipment are now entirely free from the seat which falls away, leaving him at a safe altitude for a normal parachute descent. An important feature of this arrangement is that the parachute canopy is always above the seat, thus the danger of the seat falling upon and collapsing the parachute is obviated.

What I claim is:

1. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue connected thereto and to the seat by means of a shackle, harness and seat lock mechanism for locking the harness to the seat, a time delay mechanism operative after a predetermined time interval for releasing the drogue shackle from the seat and releasing the seat lock mechanism, of drogue release mechanism comprising an inner torque shaft, an outer torque shaft, the shafts being free to turn independently of one another, means on the outer shaft for releasing the seat lock mechanism, a member on the outer shaft normally holding the shackle to the seat, locking means mounted on the seat frame retaining said member to holding position, means on the inner shaft for holding said locking means normally against movement, said means on the inner shaft being actuated by the said time delay mechanism to release the locking means to free the said member so that the drogue shackle is released from the seat, the shackle during its withdrawal from the seat transmitting a drive through said member to the outer shaft to release the seat lock mechanism.

2. Drogue release mechanism as claimed in claim 1, having overriding manual control means.

3. The combination in an ejection seat for aircraft having a frame on which the seat is mounted, a guide adapted to be fixed in the aircraft so as to be directed toward an outlet from which the seat may be ejected, an ejection gun operating between the seat frame and a fixed part of the aircraft to eject the seat and its frame along the guide, a main parachute, a drogue gun, a drogue connected thereto and to the seat by means of a shackle, harness and seat lock mechanism for locking the harness to the seat, a time delay mechanism operative after a predetermined time interval for releasing the drogue shackle from the seat and releasing the seat lock mechanism, of drogue release mechanism comprising an inner torque shaft, an outer torque shaft, the shafts being free to turn independently of one another, means on the outer shaft for releasing the seat lock mechanism, a forked lever on the outer shaft normally holding the shackle to the seat, latch levers mounted on the seat frame retaining said forked lever to holding position, hooks on the inner shaft for holding said latch levers normally against movement, the hooks being actuated by the said time delay mechanism to release the latch levers to free the said forked lever so that the drogue shackle is released from the seat, the shackle during its withdrawal from the seat transmitting a drive through said forked lever to the outer shaft to release the seat lock mechanism.

4. The combination in an ejection seat for aircraft having a frame on which the seat is mounted, a guide adapted to be fixed in the aircraft so as to be directed toward an outlet from which the seat may be ejected, an ejection gun, a firing cable therefor, said gun operating between the seat frame and a fixed part of the aircraft to eject the seat and its frame along the guide, a main parachute, a drogue gun, a drogue connected thereto and to a cross beam of the seat by means of a shackle, harness and seat lock mechanism for locking the harness to the seat, a time delay mechanism operative after a predetermined time interval for releasing the drogue shackle from the seat and releasing the seat lock mechanism, manual control means acting independently of said time delay mechanism, of drogue release mechanism comprising an inner torque shaft, an outer torque shaft, the shafts being free to turn independently of one another, means on the outer shaft for releasing the seat lock mechanism, a forked lever on the outer shaft normally holding the shackle to the seat, locking means mounted on the seat frame retaining said forked lever to holding position, means on the inner shaft for holding said locking means against movement, said means when actuated automatically releasing the locking means to free the said forked lever so that the drogue shackle is released from the seat, the shackle during its withdrawal from the seat transmitting a drive through said forked lever to the outer shaft to release the seat lock mechanism.

5. Drogue release mechanism as claimed in claim 4 comprising a forked lever, a spring loaded latch within each fork member of the lever, and a shackle provided with grooves in which said latches engage, and a tapered link on the firing cable of the ejector gun received in tapered grooves in said shackle.

6. Drogue release mechanism as claimed in claim 4, in which the cross beam of the seat has a shallow channel wall with three sides and a flared cutaway, and the ends of the forked lever form the fourth side thus providing a slot in which the drogue shackle is inserted.

7. Drogue release mechanism comprising an inner torque shaft, an outer torque shaft, the shafts being free to turn independently of one another, means on the outer shaft for releasing the seat lock mechanism, a member on the outer shaft normally holding the shackle to an aircraft seat frame, locking means mounted on the seat frame retaining said member in position, means on the inner shaft for holding said locking means against movement, time delay mechanism actuating said means on the inner shaft to release the locking means to allow the said member to be moved to release the drogue shackle from the seat, the shackle during its withdrawal transmitting a drive through said member to the outer shaft to release the seat lock mechanism, said time delay mechanism comprising a latch, a sear rod for releasing said latch, a push rod device attached to the holding means on the inner shaft, a main spring actuating said push rod device on release of the latch, and a gear train and escapement controlling the movement of said push rod device.

8. Drogue release mechanism as claimed in claim 7, having a barometric control for said time delay mechanism.

9. Drogue release mechanism as claimed in claim 7, comprising a manual override lever, a push rod device made in sectional parts, the upper portion being under spring bias and attached to the holding means on the inner shaft, a centre portion having its upper end housed within the upper portion and having a limited movement therein, and a lower portion connected to said manual override lever.

10. Drogue release mechanism comprising an inner torque shaft, an outer torque shaft, the shafts being free to turn independently of one another, seat lock mechanism for locking an airman's harness to an aircraft seat means on the outer shaft for releasing said seat lock mechanism, a forked lever on the outer shaft normally holding a drogue shackle to the seat, latch levers mounted on the seat frame retaining said forked lever to holding position, means on the inner shaft for holding said latch levers against movement, said means being actuated automatically to release the latch levers to free the said forked lever to release the drogue shackle from the seat and to release the seat lock mechanism.

11. Drogue release mechanism as claimed in claim 10, having manually actuated means in addition to said automatic release means.

JAMES MARTIN.

References Cited in the file of this patent

UNITED STATES PATENTS

| Number | Name | Date |
| --- | --- | --- |
| 2,467,763 | Martin | Apr. 19, 1949 |

FOREIGN PATENTS

| Number | Country | Date |
| --- | --- | --- |
| 624,143 | Great Britain | May 27, 1949 |